United States Patent Office

3,210,265
Patented Oct. 5, 1965

3,210,265
HYDROCRACKING WITH A CRYSTALLINE ZEO-
LITE AND THE REGENERATION OF THE CATA-
LYST WITH HYDROGEN AT TEMPERATURES
ABOVE 400° F.
William E. Garwood, Haddonfield, N.J., assignor to
Socony Mobil Oil Company, Inc., a corporation of
New York
No Drawing. Filed Feb. 27, 1962, Ser. No. 176,091
28 Claims. (Cl. 208—111)

This invention relates to an improved low temperature catalytic hydrocracking process. More particularly, the present invention is directed to an advancement in hydrocracking operations whereby a hydrocarbon charge is cracked in the presence of hydrogen over an active hydrocracking catalyst under specific reaction conditions, especially low temperatures, and, if desired, low pressures without undue concern for the amount of coke deposited on said catalyst and subsequently subjecting the catalyst to regeneration by removal of such coke in a hydrogen atmosphere while completely avoiding any type of air oxidation regeneration, to restore substantially the initial activity of the hydrocracking catalyst.

Heretofore, and prior to the present invention, it is a matter of record and commercial practice to hydrocrack various hydrocarbon fractions over catalysts for periods of time until the coke deposited on the catalyst decreased the activity and selectivity of said catalyst and an oxidation regeneration was required to reactivate the catalyst for further operation. As is known, oxidation regeneration is generally detrimental to the overall life of a hydrocracking catalyst since it increases the decline of activity and selectivity of said catalyst so that over several regenerations the replacement of the catalyst is necessary. Furthermore, the catalysts utilized heretofore generally require hydrocracking temperatures in excess of over 800° F. to obtain the desired conversions and hydrogen pressures in excess of 2000 pounds per square inch and preferably in excess of 3000 pounds per square inch are used to avoid the rapid accumulation of coke deposits on the catalyst. Although catalysts are known to hydrocrack hydrocarbon fractions at temperatures below about 800° F., these operations generally refer to the use of fresh catalyst and on continued use require temperatures well in excess of about 800° F. to provides an economically attractive and a commercially feasible hydrocracking process.

Attempts have heretofore been made to provide an extremely active catalyst so that the desired hydrocracking conversion of hydrocarbon fractions can be continued for extended periods of time without substantial coke formation taking place. However, these operations use reaction conditions such as a high hydrogen recirculation rate, extremely high pressures, etc. which are costly and undesirable and also use specific types of hydrocarbon fractions which are generally refined and treated to reduce the more prominent coke producing components. In any event, additional and expensive operation steps are utilized in a hydrocracking process to avoid coke accumulation on the catalyst used in the separation. It is desired, therefore, to overcome these significant existing problems by eliminating, among other things, expensive pretreatment of the hydrocarbon charge and expensive operating conditions in providing a hydrocracking process whereby hydrocarbon fractions containing components capable of producing coke can be hydrocracked even at low hydrocracking temperatures, low pressure and/or low hydrogen recirculation rates over an extended catalyst life.

It is an object of this invention to provide a low temperature, commercially feasible hydrocracking process. It is a further object to provide a low temperature catalytic hydrocracking process which utilizes hydrocarbon fractions containing components capable of producing coke and yet maintains essentially the initial catalyst activity over an extended catalyst life. Another object is to provide a low temperature catalytic hydrocracking process which avoids using an oxidative regeneration step and substantially extends the life of the catalyst used.

The above and other objects which will be apparent to those skilled in the art are realized in accordance with this invention. Accordingly, the present invention comprises a process for hydrocracking a hydrocarbon fraction which has an initial boiling point of at least about 400° F., a 50 percent point of at least about 500° F. and an end boiling point of at least about 600° F. and which contains components capable of producing coke under hydrocracking conditions, by contacting said hydrocarbon fraction with an active hydrocracking catalyst in the presence of hydrogen under hydrocracking conditions which utilize temperatures below about 790° F. and pressures as low as 200 pounds per square inch, and during which coke is deposited on said catalyst, followed by hydrogenative regeneration of such catalyst to afford a process wherein the catalyst maintains substantially its activity and selectivity after a plurality of regenerations. As will be evident, this invention provides an improvement in maintaining the stability of hydrocracking catalysts which affords a definite economic advantage of commercial significance in maintaining high yields of desired products even at low hydrocracking temperatures and pressures. The catalyst used in the process of this invention is one which affords hydrocracking of hydrocarbon fractions to desirable products at temperatures below about 790° F. over extended periods of time. These catalysts generally comprise a hydrogenation component intimately admixed with a cracking component.

It has theretofore been proposed to convert hydrocarbon fractions to products of increased octane number by subjecting them to reforming operations. These operations employ hydrogen and catalyst which generally comprises a hydrogenation component. The hydrocracking process described herein is distinct from the reforming process of the prior art that involved use of a hydrogenation component catalyst. There are at least four differences between the cracking process of this invention and the aforementioned reforming operations. First of all, it is to be noted that the processes are carried out for two different purposes. Cracking is used to convert high boiling hydrocarbon fractions into low boiling hydrocarbon fractions while reforming is carried out for the purpose of increasing the octane number of low boiling hydrocarbon fractions with little or no cracking. Secondly, the charge stocks employed in cracking and in reforming are not the same. A reforming charge stock, i.e. a naphtha, ordinarily has an initial boiling point well below about 400° F. and usually as low as 125° F. to 200° F. Regardless of the initial boiling point, however, the reforming charge stocks have 50 percent points well below 500° F. and end boiling points far below 600° F. Cracking charge stocks employed in the instant process, on the other hand, have initial boiling points of at least about 400° F., 50 percent points of at least about 500° F. and end boiling points of at least about 600° F. A third difference relates to the chemical reactions involved in the process. In reforming, it is desired to produce gasolines having substantially aromatic hydrocarbon contents from highly saturated reforming charge stocks. Accordingly, reforming involves aromatization reactions resulting in the production of large amounts of hydrogen during the reforming operation. Cracking, on the other hand, does not involve these aromatization reactions since the purpose of cracking is to convert high boiling hydrocarbons by selective breakage of carbon to carbon bonds. In contrast to reforming, such operation consumes hydrogen. A still further distinction resides in the fact that the hydrocracking process of this invention is obtainable at temperatures that are lower than the temperatures at which reforming processes are obtainable. It will accordingly be appreciated that the aforementioned reforming processes of the prior art and the hydrocracking process of this invention are clearly distinct.

The hydrocarbon charges which can be used in this process include gas oils, residual stocks, cycle stocks which have previously been cracked in this or another cracking process, "whole topped crudes" and heavy hydrocarbon fractions derived from the destructive hydrogenation of coal, tars, pitches, asphalts, shale oils, etc. such as for example, "middle oil." The hydrocarbons and particularly petroleum hydrocarbon charges which are used have an initial boiling point of at least about 400° F., a 50 percent point of at least about 500° F. and an end boiling point of at least about 600° F. The hydrocarbon fractions which can be utilized are those fractions which contain coke producing components including those petroleum stocks containing a high nitrogen content, and/or high aromatics content, and/or high boiling components and the like. Various hydrocarbon charges are utilized for hydrocracking where there is no significant coke formation when using special reaction conditions, such as high pressures, high hydrogen recirculation ratios, and the like, but the use of special reaction conditions are expensive and generally require larger and/or special costly equipment. In utilizing the process of this invention, hydrocarbon fractions can be used at low temperatures and low pressures if desired in standard equipment without undue concern of the coke formation while yet maintaining high yields of the desired products over extended periods of time. Also, under these conditions, hydrocarbons known to be substantial coke producers in hydrocracking such as those which boil above 600° F., which have a nitrogen content in excess of 0.1 weight percent and which have an aromatics content in excess of 15 weight percent or combinations thereof can be successfully used in the process of the invention without a detrimental effect on the catalysts utilized.

The catalysts utilized in this invention are composed of one or more hydrogenation components combined with an acidic cracking component and are very active so as to provide conversions at temperatures not exceeding 790° F. of hydrocracked products boiling below about 390° F. in excess of 20 percent by volume based on the hydrocarbon fraction charge. The hydrogenation component can include metals, oxides and sulfides of metals of the Periodic Table which fall in Group VIA including chromium, molybdenum, tungsten and the like, and Group VIII including cobalt, nickel, platinum, palladium, rhodium and the like and combinations of metals, sulfides and oxides of metals of Groups VIA and VIII, such as nickel tungsten sulfide, cobalt oxide-molybdenum oxide and the like. The amount of hydrogenation component can range from about 0.1 to about 30 weight percent based on the catalyst. The hydrogenation component may be combined with the acidic cracking component in any feasible manner which affords intimate contact of the two components employing well known techniques such as impregnation, coprecipitation, cogellation, and mechanical admixture of one component with the other. It is to be understood that the particular method by which the hydrogenation component is affixed to the acidic cracking component is not critical.

The acidic cracking component may consist of two or more refractory oxides of the elements of Groups IIA, IIIB, IVA and IVB of the Periodic Table characterized by an activity index of at least 25. The term "activity index," as utilized herein, refers to the cracking activity of the cracking component determined in accordance with the CAT-A method, which method is described in National Petroleum News 36, page PR537 (August 2, 1944). Thus, representative hydrocracking catalysts include the oxides of cobalt and molybdenum intimately combined with or impregnated on a cracking component such as composites of silica-alumina, silica-titania, silica-zirconia, silica-magnesia, alumina-boria, etc. or a combination of tungsten and nickel which has been sulfided and deposited on a cracking component of the above type. Another group of hydrocracking catalysts include one or more of the platinum metals, i.e. platinum, palladium, rhodium, osmium, iridium, or ruthenium deposited in minor amount on a cracking component such as described above. All of the foregoing catalysts are known in the art and may generally be employed in the present process providing conversion temperatures do not exceed 790° F. Thus, the improvements realized with the process of the invention are confined to particular active hydrocracking catalysts.

The preferred acidic cracking component is a crystalline aluminosilicate, preferably a crystalline rare earth aluminosilicate, having an alkali metal content of less than three weight percent and having a structure of rigid three-dimensional networks characterized by a uniform effective pore diameter between 6 and 15 Angstrom units.

To prepare the crystalline aluminosilicate acidic cracking component, a crystalline alkali metal aluminosilicate, for example, such as those described in U.S. 2,882,244, is base-exchanged by treatment with a fluid essentially containing an ion capable of replacing the alkali metal. As the replacing ion, particular preference is accorded rare earth metals, alkaline earth metals, hydrogen, ammonium and mixtures thereof with one another. The alkali metal content of the finished product should be less than about 3 and preferably less than about 2 percent by weight. The base-exchange media, preferably in the form of a solution, may be contacted with the crystalline aluminosilicate of uniform pore structure in the form of a fine powder, a compressed pellet, extruded pellet, spheroidal bead or other suitable particle shape. It has been found that the desired base-exchange may be effected most readily if the alkali metal aluminosilicate undergoing treatment has not previously been subjected to a temperature above about 600° F.

Base-exchange required for introducing the necessary replacing ions is carried out for a sufficient period of time and under appropriate temperature conditions to replace at least about 80 percent of the alkali metal originally contained in the aluminosilicate and to effectively reduce the alkali metal content of the resulting composite to below about 3 weight percent. It is contemplated that any ionizable compound of hydrogen, ammonium or a suitable metal from Groups II to VIII inclusive of the Periodic Table capable of replacing the alkali metal may be employed for base-exchange either alone or in combination with other ions. Compounds will be used wherein the replacing ion is in the cationic state. Inorganic salts will usually be employed. Suitable materials include soluble compounds of calcium, magnesium, manganese, vanadium, chromium, cerium, aluminum, lanthanum, praseodymium, neodymium, samarium and other rare earths, as well as solutions containing mixtures of these ions and mixtures of the same with other ions, such as hydrogen and ammonium. Organic salts of the foregoing metals, such as acetate and formate may also be used as well as very dilute or weak acids.

While water will ordinarily be the solvent in the base-exchange solutions used, it is contemplated that other solvents, although generally less preferred, may be used. Thus, in addition to aqueous solutions, alcoholic solutions, etc., of suitable compounds as noted above, may be employed in producing the aluminosilicate utilized in the present process. It will be understood that the compounds employed for the base-exchange solution undergo ionization in the particular solvent used.

The concentration of compound employed in the base-exchange solution may vary depending on the nature of the particular compound used, on the alkali metal aluminosilicate undergoing treatment and on the conditions under which treatment is effected. The overall concentration of replacing ion, however, is such as to reduce the alkali metal content of the original alkali metal aluminosilicate to less than about 3 percent by weight, on a dry solids basis. Generally, the concentration of compound, the cation of which replaces alkali metal from the alkali metal aluminosilicate, is within the range of 0.2 to 30 percent by weight, although, as noted hereinabove, other solution concentrations may be employed, providing the alkali metal content is reduced to less than about 3 and preferably less than 2 percent by weight.

The temperature at which base-exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the alkali metal content of the composite after undergoing base-exchange is less than 3 percent by weight. It will be appreciated that such period of contact may vary widely depending on the temperature of the solution, the nature of the alkali metal aluminosilicate used, and the particular compound employed for base-exchange. Thus, the time of contact may extend from a brief period of the order of a few hours for small particles to longer periods of the order of days for large pellets.

After base-exchange treatment, the product is removed from the treating solution. Anions introduced as a result of treating with the base-exchange solution are removed by water-washing the treated composite for such period of time until the same is free of said anions. The washed product is then dried, generally in air, to remove substantially all the water therefrom. While drying may be effected at ambient temperature, it is more satisfactory to facilitate the removal of moisture by maintaining the product at a temperature between about 150 and about 600° F. for 4 to 48 hours.

The dried material is then subjected to an activating treatment essential to render the composition catalytically active. Such treatment entails heating the dried material in an atmosphere which does not adversely affect the catalyst such as air, nitrogen, hydrogen, flue gas, helium or other inert gas. Generally, the dried material is heated in air to a temperature in the aproximate range of 500° F. to 1500° F. for a period of at least about 1 hour and usually between 1 and 48 hours. The finished product has a surface area within the approximate range of 100 to 700 square meters per gram.

It has further been found that the activity of the finished product of the above-described composition may be improved by subjecting the same to a mild steam treatment. Steam treatment may be carried out at a temperature within the approximate range of 800° F. to 1500° F. for at least 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 10 percent by volume, but containing air or other gas substantially inert with respect to the composite being treated may be used and such mixtures may, in some instances, be desirable with the use of the more elevated temperatures to avoid possible deactivation of the aluminosilicates. The above-noted steam treatment serves to convert a substantial portion of the crystallinity of the original aluminosilicate to noncrystalline or amorphous material. It is thus one particular embodiment of the invention that at least about 25 percent and, preferably, at least 50 percent of the original crystallinity possessed by the aluminosilicate structure be converted to amorphous material to achieve a resulting catalyst product of optimum cracking characteristics. The hydrogenation components are then combined with the crystalline aluminosilicate.

A further feasible catalyst suitable for use in the process of the invention is a hydrogenation component deposited on a hydrous oxide matrix selected from the group consiting of clays and inorganic oxide gels having dispersed therein in finely divided form a base-exchange crystalline aluminosilicate such as described hereinabove. Preferably, the particle size crystalline aluminosilicates dispersed in the hydrous oxide matrix is characterized by a weight particle diameter of less than about 40, and preferably less than 10, microns.

For preparation of the matrix containing finely divided aluminosilicate, a crystalline alkali metal aluminosilicate may be initially combined with the selected matrix and the resulting composite base-exchanged substantially free of alkali metal by treating with a solution containing at least one ion capable of replacing the alkali metal, followed by washing the resulting base-exchanged material free of water-soluble matter, drying the washed composite and subjecting the same to a thermal activating treatment as described hereinabove. Alternatively the alkali metal crystalline aluminosilicate may undergo base-exchange, as above, prior to intimate admixture thereof with a hydrous oxide matrix, for example, an inorganic oxide hydrogel. In accordance with such manner of operation, the resulting mixture of finely divided previously base-exchanged aluminosilicate distributed throughout and held suspended in a matrix of the inorganic oxide hydrogel, is washed free of soluble matter, dried and thermally activated. After the base has been prepared, the desired hydrogenation component can be deposited thereon.

Intimate admixture of the finely divided aluminosilicate and a hydrous oxide matrix such as clay or an inorganic oxide hydrogel may be accomplished, for example, by ball milling the two materials together over an extended period of time, preferably in the presence of water, under conditions to reduce the particle size of the aluminosilicate to a weight mean particle diameter of less than 40, and preferably within the range of 2 to 7 microns. Such method of admixture, however, is less preferred than that achieved by dispersing the powdered aluminosilicate in an inorganic hydrosol. Following this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydosol or may be admixed in the form of a separate stream with streams of the hydrosol-forming reactants in a mixing nozzle or other means where the reactants are brought into intimate contact. As noted hereinabove, it is preferred that the aluminosilicate introduced into the hydrosol have a weight mean particle diameter less than 40 microns and preferably between 2 and 7 microns. The use of aluminosilicate having a weight mean particle diameter in excess of 40 microns gave rise to a physically weak product, while the use of aluminosilicate having a weight mean particle diameter of less than 1 micron produced a product of low diffusivity.

In the admixture of the base composed of aluminosilicate and inorganic oxide gel, the inorganic oxide gel employed serves as a matrix for the crystalline aluminosilicate powder distributed therein. While silica gel, may be utilized as a suitable matrix, it is preferred that the siliceous gel employed be a cogel of silica and an oxide of at least one metal selected from the group consisting of metals of Groups IIA, IIIB and IVA of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hyrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and siliceous gel matrix may very widely with the crystalline aluminosilicate content ranging from about 2 to about 90 percent by weight and more usually, particularly where the composite is prepared in the form of beads, in the range of about 5 to about 50 percent by weight of the composite. While the above catalysts represent preferred embodiments for use in the hydrocracking process described herein, it is contemplated that other catalysts may be employed which have the requisite activity to provide a 20 volume percent conversion of the hydrocarbon charge having an initial boiling point of at least 400° F. to products boiling below 390° F. at reaction temperatures below about 790° F.

By the process of this invention, the removal of the accumulated coke from the hydrocracking catalyst is carried out by using hydrogen as the regeneration gas and completely avoiding an oxidative regeneration operation. It has been discovered that the use of hydrogen for regeneration not only removes substantially all of the coke deposits on the catalyst but substantially maintains the initial activity of the fresh catalyst on prolonged use and also maintains, and in some instances, improves yields of desired hydrocracked products after one or more hydrogen regenerations. This discovery is in contrast to the result expected from prior oxidative regeneration of hydrocracking catalysts.

It is a requirement of this invention to utilize an extremely active catalyst, hereinbefore described, which provides, at temperatures below about 790° F., at least a 20 volume percent conversion of the hydrocarbon charge to desired products boiling below about 390° F. over an extended catalyst life. The conversion of the hydrocarbon charge to products boiling below about 390° F. may vary from about 20 volume percent conversion to 100 volume percent conversion depending on the type and properties of the hydrocarbon fractions used. For instance, a gas oil boiling between 400° F. and 600° F. can be hydrocracked readily and without difficulty to products boiling below about 390° F. at conversion levels from 20 to as high as 85 to 100 volume percent. On the other hand, hydrocracking hydrocarbon fractions boiling in excess of 600° F. to products boiling below about 390° F. would preferably require lower conversion levels in the range from about 20 to about 55 volume percent at reaction temperatures below about 790° F. to avoid permanent detrimental affects on the catalyst used.

The advantage of the process of this invention is that hydrocracking operations can be conducted without undue concern for the coke accumulation on the catalyst as long as the desired products and conversions can be obtained at reaction temperatures below 790° F. Reaction temperatures can range from about 400° F. to about 790° F., preferably in the range from about 600° F. to about 750° F. Reaction temperatures in excess of 790° F. are to be avoided since the coke deposits at these high temperatures appear to change in character so that it is practically impossible to remove substantially all of the coke by hydrogen regeneration and oxidative regeneration is finally required to reactivate the catalyst destroying the advantages obtained in utilizing the process of this invention. Without being limited by any theory, it appears that at reaction temperatures in excess of 790° F. the coke which accumulates on the catalyst approaches the composition and character of graphite or hard coke. It is, therefore, important to limit the reaction temperatures to those providing adequate conversions at temperatures below 790° F. This temperature limitation provides an excellent control of the hydrocracking operation for if the catalyst utilized requires temperatures of 790° F. to obtain the desired conversion, it is time to reactivate the catalyst using hydrogen regeneration. It is desirable, however, to operate the hydrocracking step at predetermined temperatures well below 790° F., if possible. For instance, if a fresh catalyst requires a temperature of 700° F. to obtain the desired conversion, it may be desirable, depending on the catalyst and extent of conversion, among other factors, to regenerate the catalyst when the temperature requirements approach 730° F. This temperature is well below the maximum temperature of 790° F. and the protection of the catalyst from excessive temperatures is assured. Since it is known that as the coke accumulates on the hydrocracking catalyst, higher reaction temperatures are needed to obtain a certain conversion, the amount of coke on the catalyst is of no special significance since the temperatures designate the time for regeneration.

Another advantage of the invention relates to the fact that low pressures in the hydrocracking step can be utilized. Pressures as low as 200 pounds per square inch can be used. Pressures in the range from 500 to 1500 pounds per square inch are preferable but pressures up to 3000 pounds per square inch or higher can be used. Using the low pressures permits the use of reforming equipment, if desired, for hydrocracking operations and avoids the use of special equipment such as a high pressure steel reactor and high pressure fittings among others which are costly and significantly add to the expense of the hydrocracking operation. As is known, using low pressures in hydrocracking operations increases significantly the coke accumulation on the catalyst. As has been heretofore described, in the use of the process of this invention, the accumulation of coke on the catalyst is not considered detrimental if reaction temperatures do not exceed 790° F. and the coke can be readily removed by hydrogenative regeneration and not affect, substantially, the activity and selectivity of the catalyst.

The other conditions which can be utilized in the hydrocracking step of this process are considered normal hydrocracking conditions. The liquid hourly space velocity, i.e. the liquid volume of hydrocarbon per hour per volume of catalyst employed can range between about 0.1 to about 10. In general, the molar ratio of hydrogen to hydrocarbon charge employed can range from about 2 to about 80 and more particularly between about 5 and about 50.

After the hydrocracking step has reached a predetermined reaction temperature not exceeding 790° F., the catalyst utilized requires a hydrogen regeneration to remove accumulated coke. This hydrogen regeneration can be conducted in the same reactor by discontinuing the hydrocarbon fraction feed and permitting the hydrogen to flow over the catalyst to remove the coke. It is preferable to provide more than one reactor so that the catalyst in one reactor is being regenerated with hydrogen while the catalyst in the other reactors is being used to hydrocrack charge stock. This embodies the use of a swing reactor so that a fresh or regenerated catalyst bed can be provided to continue the hydrocracking operation.

The hydrogen regeneration can be conducted at hydrocracking reaction temperatures or greater. In order to accelerate the coke removal from the catalyst, it is desirable to carry out the hydrogen regeneration at high temperatures but avoiding attainment of temperatures which can thermally destroy the effectiveness of the catalyst. The hydrogen regeneration temperatures can range from as low as 400° F. to as high as 1400° F. depending on the catalyst utilized. It is preferable to use regeneration temperatures about 40° F. to about 450° F. greater than the hydrocracking temperatures utilized. The hydrogen regeneration is conducted for a period of time required to remove substantially all of the accumulated coke, i.e. the coke content is below about 3 weight percent and preferably below about 2 weight and more preferably below about 0.5 weight percent of the catalyst. The time of regeneration can range from 1 hour or shorter, to about 48 hours or longer, depending on the amount of accumulated coke to be removed.

Pure hydrogen can be used in the regeneration of the catalysts in the process of the invention. Hydrogen of low purity obtained from recycle of the hydrogen in the hydrocracking operation or obtained from other hydrogenation processes, such as reforming, can be used, but, with some catalysts, the recycle hydrogen may be desirably subjected to a purification process to remove some of the undesirable impurities such as water, nitrogen compounds, sulfur compounds, and the like. Hydrogen mixed with inert gases such as nitrogen, but free of oxygen, can also be in the regeneration step. The pressures which can be utilized in the regeneration step can range from about 200 pounds per square inch or lower to 3000 pounds per square inch or higher. It is preferable to use pressures from about 500 to about 2000 pounds per square inch.

The following examples will serve to illustrate the advantages achieved in accordance with the process of this invention:

EXAMPLE 1

A crystalline sodium aluminosilicate, as described in U.S. Patent 2,882,244 identified as 13-X molecular sieve, was base-exchanged with a rare earth chloride solution containing 5 percent by weight of rare earth chloride [$RECl_3 \cdot 6H_2O$] at 180–200° F. to remove the sodium ions from the aluminosilicate and replace them with the chemical equivalent of rare earth ions. The rare earth chlorides used had the following oxides determined as follows:

| Compound: | Weight percent |
|---|---|
| $La_2O_3$ | 24 |
| $Ce_2O_3$ | 48 |
| $Pr_6O_{11}$ | 5 |
| $Nd_2O_3$ | 17 |
| $Sm_2O_3$ | 3 |
| $Gd_2O_3$ | 2 |
| $Y_2O_3$ | 0.2 |
| Other RE oxides | 0.8 |

After the base-exchange, the aluminosilicate was then washed free of water soluble salts. The resulting product was dried for 20 hours at 220° F., pelleted and sized to 14–25 mesh, and calcined for 10 hours at 1000° F. The aluminosilicate contained 27.4 weight percent of rare earth oxides.

The rare earth aluminosilicate (111.4 grams) was then impregnated with 66 cubic centimeters of aqueous ammonium tungstate solution (tungsten content 0.158 g. per cc.), adjusted to pH 6.5 with citric acid. The resulting product was dried for 16 hours at 230° F. The impregnation was repeated using 15.3 cubic centimeters of the same solution, and this product again dried for 16 hours at 230° F. The resulting product was calcined in 2 volume percent of oxygen and nitrogen at 1000° F. for 24 hours. The calcined product was then impregnated with 43 cubic centimeters of aqueous nickel nitrate (nickel content 0.04 gram per cubic centimeter) and the resulting product was calcinated for 3 hours at 1000° F. This product had a tungsten content of 9.8 weight percent and a nickel content of 3.8 weight percent. The calcined product was then sulfided with a 50/50 volume mixture of hydrogen sulfide to hydrogen at a rate of 200 cubic centimeters per minute per 100 cubic centimeters of catalyst, at 800° F. for 5 hours. The nickel tungsten sulfide of rare earth aluminosilicate product had a sulfur content of 3.8 weight percent after sulfide treatment. In the following examples, the hydrocarbon fratcion used as the charge stock for hydrocracking was a Mid-Continent heavy gas oil having the following properties:

| | |
|---|---|
| Gravity, ° API | 26.8 |
| Gravity, specific | 0.8939 |
| Vacuum assay, ° F.: | |
| IBP | 579 |
| 5% | 669 |
| 10% | 682 |
| 20% | 700 |
| 30% | 720 |
| 40% | 744 |
| 50% | 772 |
| 60% | 802 |
| 70% | 832 |
| 80% | 869 |
| 90% | 918 |
| 95% | 946 |
| Pour point, ° F. | +90 |
| Aniline No., ° F. | 187.8 |
| Nitrogen, wt. percent | 0.06 |
| Sulfur, wt. percent | 0.57 |
| Oxygen, wt. percent | 0.77 |

EXAMPLE 2

The Mid-Continent heavy gas oil described above, was hydrocracked in the presence of the catalyst of Example 1. The hydrocracking conditions utilized were 2000 pounds per square inch pressure, a liquid hourly space velocity of 0.5, a hydrogen charge rate of 3000 standard cubic feet per barrel of hydrocarbon charge (a molar hydrogen to hydrocarbon charge ratio of 9.5) and reaction temperatures to obtain approximately 40 volume percent conversion to products boiling below 390° F. The term conversion is expressed in terms of volume percent of the initial charge which is transformed by hydrocracking and obtained by subtracting the volume percent of material boiling above 390° F. from 100 percent, i.e. from the initial volume of the charge. The catalyst was subjected to 6 days of hydrocracking and then regenerated with an oxygen-containing gas according to the following procedure:

The catalyst was heated to 750° F. in a stream of nitrogen at a rate of 590 milliliters per minute per 100 cubic centimeters of catalyst while injecting oxygen in the nitrogen stream at a maximum rate of 12 milliliters per minute per 100 cubic centimeters of catalyst. The hot burning zone followed down the catalyst bed (maximum temperature 800° F.). When the zone burning was complete, the temperature was raised to 900° F. for clean up burning and continued until the weight increase in an ascarite scrubber was less than 0.05 gram per hour per 100 cubic centimeters of catalyst for two successive hours. The regenerating gas was replaced with air and the temperature raised to 1000° F. and continued until the weight increase of the ascarite scrubber was again less than 0.05 gram per 2 successive hours.

The regenerated catalyst was then sulfided in the same manner as it was in the fresh state. A total of 5 regenerations were performed on this catalyst between successive gas oil hydrocracking periods of 6, 3, 3, 3, 10 and 8 days. The hydrocracking data are described in detail in Table I below:

The Mid-Continent heavy gas oil, hereinbefore described, was hydrocracked in the presence of the above catalyst under the same conditions as used in Example 2.

*Table I.—Alternate hydrocracking-oxidative regeneration cycles—sulfided nickel-tungsten on rare earth aluminosilicate catalyst*

| Catalyst Condition | Fresh | 1 Regen. | 2 Regen. | 3 Regen. | 4 Regen. | 5 Regen. |
|---|---|---|---|---|---|---|
| Sulfur, Wt. percent | 3.8 | 4.2 | 3.4 | 4.0 | 3.7 | |
| Time on Stream, Days | 6 | 3 | 3 | 3 | 10 | 8 |
| Activity at 48 hours, ° F.a | 718 | 726 | 719 | 719 | 733 | 743 |
| Final Temp., ° F | 733 | 732 | 724 | 724 | 745 | 751 |
| Material Balance Data: | | | | | | |
|   Time Taken, Hours | 64–68 | 62–66 | 60–64 | 54–58 | 67–71 | 74–81 |
|   Average Cat. Temp.° F | 723 | 732 | 723 | 724 | 733 | 747 |
|   Conversion, Vol. Percent 100%–390° F.+ | 52.3 | 48.3 | 51.7 | 48.0 | 48.6 | 46.7 |
|   Conversion, Vol. Percent 100%–650° F.+ | 69.0 | 65.2 | 74.0 | 66.9 | 74.2 | 68.4 |
|   Recovery, Wt. Percent | 100.6 | 100.5 | 103.3 | 102.3 | 102.1 | 96.7 |
| Yields, NLB: | | | | | | |
|   Dry Gas, Wt. Percent | 2.6 | 2.5 | 2.6 | 2.6 | 2.4 | 3.1 |
|   $C_4$'s, Vol. Percent | 11.4 | 10.5 | 12.1 | 12.4 | 10.7 | 12.5 |
|   $C_5$'s, Vol. Percent | 9.2 | 8.5 | 9.8 | 10.1 | 9.6 | 10.1 |
|   $C_6$–170° F., Vol. Percent | 9.3 | 8.4 | 7.5 | 4.9 | 8.3 | 8.5 |
|   170–390° F., Vol. Percent | 39.2 | 34.5 | 36.5 | 34.8 | 35.2 | 30.3 |
|   390–650° F., Vol. Percent | 16.6 | 16.8 | 22.2 | 18.9 | 25.6 | 21.8 |
|   650° F.+, Vol. Percent | 31.1 | 34.9 | 26.1 | 33.2 | 25.8 | 31.5 |
|   $H^2$ Consumption, s.c.f. (bbl.) | 1,275 | 1,150 | 1,195 | 1,190 | 1,235 | 1,230 |
| Yields, Calculated at 40% Conv., 100%–390° F.+: | | | | | | |
|   Dry Gas, Wt. Percent | 2.0 | 2.0 | 2.0 | 2.2 | 1.9 | 2.6 |
|   $C_4$'s Vol. Percent | 8.7 | 8.7 | 9.4 | 10.3 | 8.8 | 10.7 |
|   170–390° F., Vol. Percent | 33.8 | 31.0 | 31.5 | 31.2 | 31.4 | 28.0 |
|   $C_5$+, Vol. Percent | 107.9 | 105.0 | 104.9 | 103.7 | 106.1 | 104.0 |
| Used Catalyst: | | | | | | |
|   Wt. Percent C | 8.4 | 9.0 | 9.6 | 7.4 | 8.5 | 5.5 |
|   Wt. Percent S | 3.0 | 3.3 | 3.5 | 3.3 | 3.4 | 3.4 | a Calculated by least squares method for 47° API gravity syn crude.

EXAMPLE 3

The catalyst used in this example was prepared in a manner similar to that of Example 1, except that the exchanging solution contained 2 percent ammonium chloride in addition to 5 percent rare earth chlorides. The rare earth oxide content of the finished base was 23.5 weight percent. The finished catalyst contained 9.4 weight percent tungsten and 3.7 weight percent nickel.

After hydrocracking, the catalyst was regenerated with hydrogen. After each regeneration, the catalyst was then sulfided in the same manner as it was in the fresh state. The hydrocracking periods with this catalyst were 6, 3, 3, 3, and 3 days. Carbon contents of the coked catalyst ranged from 6.7 to 9.8 weight percent. The hydrocracking data are described in detail in Table II below:

*Table II.—Alternate hydrocracking-hydrogenative regeneration cycles—sulfided nickel-tungsten on rare earth aluminosilicate catalyst*

| Catalyst Condition | Fresh | 1 Regen. | 2 Regen. | 3 Regen. | 4 Regen. |
|---|---|---|---|---|---|
| Sulfur, Wt. Percent | | | 3.7 | 3.9 | |
| Time on Stream, Days | 6 | 3 | 3 | 3 | 3 |
| Activity at 48 hours, ° F | 707 | 706 | 712 | 701 | 704 |
| Final Temperature, ° F | 714 | 711 | 714 | 707 | 708 |
| Material Balance Data: | | | | | |
|   Time Taken, Hours | 68–72 | 68–72 | 55–59 | 60–64 | 52–56 |
|   Average Cat. Temperature, ° F | 709 | 711 | 714 | 707 | 706 |
|   Conversion, Vol. Percent 100%–390° F.+ | 43.3 | 44.6 | 46.6 | 47.6 | 46.6 |
|   Conversion, Vol. Percent 100%–650° F.+ | 62.4 | 64.7 | 70.6 | 69.5 | 63.5 |
|   Recovery, Wt. Percent | 98.1 | 100.5 | 100.9 | 100.4 | 95.8 |
| Yields: | | | | | |
|   Dry Gas, Wt. Percent | 1.7 | 1.7 | 1.7 | 1.6 | 1.7 |
|   $C_4$'s, Vol. Percent | 8.3 | 7.6 | 7.7 | 6.1 | 9.8 |
|   $C_5$'s, Vol. Percent | 6.8 | 5.7 | 7.0 | 6.9 | 8.9 |
|   $C_6$–170° F., Vol. Percent | 5.8 | 6.9 | 6.9 | 6.9 | 8.7 |
|   170–390° F., Vol. Percent | 36.6 | 38.4 | 38.4 | 41.7 | 34.5 |
|   390–650° F., Vol. Percent | 19.1 | 20.2 | 24.6 | 21.9 | 16.9 |
|   650° F.+, Vol. Percent | 37.6 | 35.3 | 29.4 | 30.5 | 36.5 |
|   $H_2$ Consumption s.c.f. (bbl.) | 1,185 | 1,180 | 1,185 | 1,095 | 1,115 |
| Yields, Calculated at 40% Conv., 100%–390° F.+: | | | | | |
|   Dry Gas, Wt. Percent | 1.6 | 1.5 | 1.4 | 1.3 | 1.4 |
|   $C_4$'s, Vol. Percent | 7.7 | 6.8 | 6.7 | 5.1 | 8.4 |
|   170–390° F., Vol. Percent | 34.9 | 35.8 | 35.0 | 37.2 | 33.2 |
|   $C_5$+, Vol. Percent | 106.6 | 107.1 | 107.1 | 108.8 | 108.3 |
| Used Catalyst: | | | | | |
|   Wt. Percent C | 9.8 | 8.0 | 7.5 | 7.7 | 6.7 |
|   Wt. Percent S | 2.6 | 3.0 | 3.1 | 3.1 | 3.3 |
| Hydrogen Regeneration: a | | | | | |
|   Average Cat. Temperature,° F. 799 | | 801 | 800 | 795 | 796 |
|   Time, Days | 2 | 1 | 2 | 2 | 1 |
| Regenerated Catalyst: | | | | | |
|   Wt. Percent C | 0.3 | 0.6 | 0.3 | b 0.3 | 0.6 |
|   Wt. Percent S | 2.6 | 2.9 | 2.9 | 3.2 | 3.3 | a Same pressure (2,000 p.s.i.g.) and hydrogen flow (0.445 1/min./100 cc. catalyst) as that used in hydrocracking portion of cycle. Following hydrogen regeneration, catalyst resulfided at atmospheric pressure, 50/50 vol. mixture of $H_2S/H_2$ at 800° F. for 5 hours.

b Following two successive 1-day treats at 708° F. reducing coke to 2.6 and 2.1 wt. percent, respectively (66 and 73% removal, respectively).

In comparing the data of the oxidative regeneration hydrocracking process of Table I and the hydrogenative regeneration hydrocracking process of Table II, it should be noted that using hydrogen regeneration the activity of the catalyst, i.e. temperature required to hydrocrack to a 40 percent conversion level after 4 regenerations is actually no higher than the temperature required of the fresh catalyst, while the dry gas make remained the same throughout the operation of the volume of $C_5+$ products actually increased after 4 regenerations. On the other hand, the oxidative regeneration hydrocracking process required progressively higher temperatures after 4 and 5 regenerations, while the volume $C_5+$ products decreased with almost each regeneration and in any event, the regenerated catalyst never approached the $C_5+$ yield of the fresh catalyst. Comparison of the data of Table I and Table II indicates that the process of the present invention, demonstrated by the data of Table II, accords significant improvements of yield, activity of the catalyst and the like over the oxidative regeneration hydrocracking process of Table I.

EXAMPLE 4

To demonstrate the effectiveness of the process of the invention, a nickel and tungsten sulfide on a steamed rare earth aluminosilicate catalyst, prepared in the similar manner as the catalyst in Example 1, was used to hydrocrack a Mid-Continent gas oil, heretofore described. The rare earth aluminosilicate base was steamed for 24 hours at 1200° F. with 100 percent steam at 15 pounds per square inch pressure. This fresh catalyst had the following properties: 7.6 weight percent nickel, 17.9 weight percent tungsten and 6.3 weight percent sulfur and a surface area of 220 square meters per gram. Table III, below, describes the conditions and results of 20 regeneration cycles:

are obtained over numerous regenerations using a catalyst composed of sulfided cobalt oxide (3 percent)—molybdenum oxide (10 percent) on rare earth aluminosilicate.

EXAMPLE 5

A catalyst composed of platinum deposited on a mixture of 25 weight percent cerium aluminosilicate and silica alumina was prepared in the following manner:

A solution, hereinafter called the silicate solution, of 42.6 weight percent sodium silicate, 53.1 weight percent water and 4.3 weight percent sodium aluminosilicate (as described in U.S. Patent 2,882,244) was prepared. A separate solution, hereinafter called the acid solution, composed of 93.2 weight percent water, 3.43 weight percent aluminum sulfate $[Al_2(SO_4)_3]$ and 3.23 weight percent concentrated sulfuric acid was prepared. The above-described solutions were mixed together through a nozzle using 398 cubic centimeters per minute of silicate solution at 58° F. and 320 cubic centimeters per minute acid solution at 40° F. The resulting hydrosol, containing 25 weight percent dispersed sodium aluminosilicate particles (on a finished catalyst basis) had a gel time of 1.7 seconds at 630° F. and a pH of 8.5.

Hydrogel beads of the above gel were prepared and placed in an aqueous 2 weight percent cerium chloride base-exchange solution immediately after forming. The hydrogel was contacted with the base-exchange solution nine times for 2 hour periods and three times overnight at room temperature. The base-exchanged hydrogel was then washed continuously with water until the effluent water was substantially free of chloride ion. The washed hydrogel was then dried in air at 270° F. for 20 hours calcined at 1000° F. in air for 10 hours and sized to 14

*Table III.—Alternate hydrocracking using a sulfided nickel-tungsten on steamed rare earth aluminosilicate catalyst*

| Cycle No. | 0.5 LHSV | | | | 24 Hrs. On Stream 12 Hrs. Off Stream | 3,000 s.c.f. of $H_2$ Chge/Bbl. 40% Conv. to Products Below 390° F. | | | |
|---|---|---|---|---|---|---|---|---|---|
| | Operating Pressure, p.s.i.g. | Hydrocracking Step a | | | | Regeneration Temp., ° F. | After Regeneration Step b | | |
| | | Activity at 24 Hrs. for 43° API, ° F. | Dry Gas, Wt. Percent | Heavy Naphtha, Vol. Percent | $C_5+$ Yield, Vol. Percent | | Surface Area, m.²/gm. | Catalyst | |
| | | | | | | | | S, Wt. Percent e | C, Wt. Percent |
| 1 | 1,000 | c 670 | 0.9 | 34.8 | 111.4 | 900 | | | |
| 2 | 1,000 | c 675 | 0.6 | 41.1 | 113.2 | 900 | | | |
| 3 | 1,000 | c 680 | 1.0 | 33.5 | 108.7 | 900 | 230 | 6.2 | 0.4 |
| 4 | 500 | 690 | 1.8 | 30.6 | 103.7 | 1,175 | | 6.9 | 0.3 |
| 5 | 500 | 700 | 1.3 | 34.0 | 105.3 | 1,175 | | | |
| 6 | 500 | 730 | 1.3 | 36.9 | 106.6 | 1,175 | 215 | 7.4 | 0.6 |
| 7 | 500 | 705 | 1.4 | d 36.0 | 106.9 | 1,175 | | | |
| 8 | 500 | 710 | 1.3 | 36.6 | 106.8 | 1,175 | | | |
| 9 | 500 | 715 | 1.4 | 36.7 | 106.3 | 1,175 | 220 | 7.8 | 1.1 |
| 10 | 500 | 690 | 1.2 | 34.8 | 106.5 | 1,175 | | | |
| 11 | 500 | 695 | 1.1 | 38.8 | 106.9 | 1,175 | | | |
| 12 | 500 | 685 | 0.9 | 38.9 | 107.9 | 1,175 | 210 | 8.1 | 1.1 |
| 13 | 500 | 700 | 1.2 | 35.2 | 105.5 | 1,175 | | | |
| 14 | 500 | 715 | | | | 1,175 | | | |
| 15 | 500 | 695 | 1.5 | 35.6 | 106.6 | 1,175 | 220 | 8.3 | 1.4 |
| 16 | 500 | 710 | 1.2 | 34.7 | 105.1 | 1,175 | | | |
| 17 | 500 | 695 | 1.3 | 36.6 | 106.0 | 1,175 | | | |
| 18 | 500 | 710 | 1.3 | 37.7 | 106.2 | 1,175 | 215 | 8.4 | 1.5 |
| 19 | 500 | 710 | | | | 1,175 | | | |
| 20 | 500 | 705 | 1.3 | 34.6 | 105.2 | 1,175 | 210 | 7.8 | 1.6 | a Material balance over full 24 hrs. on stream.
b $H_2$ rate equivalent to 3,000 s.c.f./bbl. at 0.5 LHSV.
c For 440° API product (40% conversion).
d Octane No. of heavy naphtha from cycle 7 was 73.7 (F-1+3 ml. TEL).
e Sulfiding Step eliminated.

The regeneration of the catalyst composed of sulfided nickel-tungsten on steamed rare earth aluminosilicate was carried out for 20 cycles. It is to be noted that at pressures of 1000 pounds per square inch excellent yields of $C_5+$ products were obtained. Reducing the pressure to 500 pounds per square inch the yields of $C_5+$ products were maintained and in most instances improved over the initial cycle run at 500 pounds per square inch. In a similar manner, as described above, improved yields to 25 mesh particles. The final product contained 0.44 weight percent sodium. In a similar manner as above an activated clay can be substituted in place of the hydrogel to obtain a satisfactory catalytic base.

The above product (46.3 grams) was impregnated with 30 cubic centimeters of an aqueous solution of chloroplatinic acid (0.0879 gram platinum per cubic centimeter). The impregnated material was wet aged at 230° F. for 16 hours, reduced with hydrogen at 450° F. for 2 hours, and finally at 900° F. for 2 hours. The platinum content of the finished catalyst was 0.43 weight percent.

EXAMPLE 6

The Mid-Continent heavy gas oil described in Example 1 was hydrocracked in the presence of the catalyst described in Example 5 under similar hydrocracking conditions as used in Example 2. The hydrocracking periods were 6, 3 and 3 days. Regenerations after each of the aforementioned periods of time were conducted using oxygen by the procedure described in Example 2. The hydrocracking data are described in detail in Table IV below:

Table IV.—Alternate hydrocracking-oxidative regeneration cycles—Pt on a base composed of a mixture of cerium aluminosilicate and silica alumina

| Catalyst Condition | Fresh | 1 Regen. | 2 Regen. |
|---|---|---|---|
| Surface Area, m.²/g | 397 | 351 | 341 |
| Hydrocracking: | | | |
| Time on Stream, Days | 6 | 3 | 3 |
| Activity at 48 hrs., ° F | 738 | 757 | 793 |
| Final Temp., ° F | 747 | 759 | 808 |
| Material Balance Data: | | | |
| Time Taken, Hours | 58-62 | 58-62 | 64-68 |
| Average Cat. Temp., ° F | 740 | 761 | 808 |
| Conversion, Vol. Percent, 100%—390° F.+ | 43.2 | 49.6 | |
| Conversion, Vol. Percent, 100%—650° F.+ | 68.7 | 66.2 | |
| Recovery, Wt. Percent | 101.7 | 102.8 | |
| Yields, NLB: | | | |
| Dry Gas, Wt. Percent | 1.9 | 3.0 | |
| $C_4$'s, Vol. Percent | 8.2 | 12.9 | |
| $C_5$'s, Vol. Percent | 6.9 | 11.0 | |
| $C_6$—170° F., Vol. Percent | 4.8 | 7.6 | |
| 170-390° F., Vol. Percent | 37.2 | 33.0 | |
| 390-650° F., Vol. Percent | 25.5 | 16.6 | |
| 650° F.+, Vol. Percent | 31.4 | 33.8 | |
| Hydrocracking:—Continued | | | |
| $H_2$ Consumption, s.c.f./bbl | 1,190 | 1,250 | |
| Yields, Calculated at 40% Conv., 100%—390° F.+: | | | |
| Dry Gas, Wt. Percent | 1.7 | 2.4 | |
| $C_4$'s, Vol. Percent | 7.6 | 10.4 | |
| 170—390° F., Vol. Percent | 35.5 | 29.3 | |
| $C_5$+, Vol. Percent | 106.3 | 104.3 | |
| Used Catalyst, Wt. Percent C | 12.0 | 9.0 | |
| Oxidative Regeneration, 2 Vol. Percent $O_2$ in $N_2$: | | | |
| 750° F. Block Setting, Time, Hours | a 13½ | a 10½ | |
| Peak Hot Spot, ° F | 792 | 792 | |
| 900° F. Block Setting, Time, Hours | 4 | 5½ | |
| Peak Hot Spot, ° F | 918 | 901 | | a $O_2$ rate cut during early stages to keep hot spot below ~800° F.

EXAMPLE 7

The catalyst used in this example was prepared in a manner similar to Example 5, except that the exchanging solution contained 2 percent ammonium chloride in addition to 2 percent cerium chloride. The cerium oxide content of the finished base was 10.8 weight percent and the platinum content of the finished catalyst was 0.68 weight percent. The Mid-Continent heavy gas oil described in Example 1 was hydrocracked in the presence of the above described catalyst under similar hydrocracking conditions as used in Example 2. The hydrocracking periods were 6, 3, 3, 3 and 3 days. Regenerations after each of the aforementioned periods of time were conducted using hydrogen to remove the accumulated coke. The hydrocracking data are described in detail in Table V below:

Table V.—Alternate hydrocracking-hydrogenative regeneration cycles—Platinum on a mixture of cerium oxide-ammonium chloride exchanged aluminosilicate and silica alumina

| Catalyst Condition | Fresh | 1 Regen. | 2 Regen. | 3 Regen. | 4 Regen. |
|---|---|---|---|---|---|
| Surface Area, m.²/g | 413 | 321 | 308 | 306 | |
| Hydrocracking: | | | | | |
| Time on Stream, Days | 6 | 3 | 3 | 3 | 3 |
| Activity at 48 hrs., ° F | 728 | 745 | 739 | 740 | 749 |
| Final Temperature, ° F | 739 | 757 | 742 | 747 | 754 |
| Material Balance Data: | | | | | |
| Time Taken, Hours | 107-111 | 68-72 | 60-64 | 56-60 | 68-72 |
| Average Catalyst Temperature, ° F | 739 | 756 | 741 | 743 | 754 |
| Conversion, Vol. Percent, 100%—390° F.+ | 46.4 | 48.5 | 46.2 | 42.8 | 46.8 |
| Conversion, Vol. Percent, 100%—650° F.+ | 76.5 | 73.7 | 70.4 | 73.6 | 69.4 |
| Recovery, Wt. Percent | 105.7 | 100.6 | 98.1 | 99.5 | 102.9 |
| Yields, NLB: | | | | | |
| Dry Gas, Wt. Percent | 2.2 | 2.3 | 2.1 | 1.5 | 2.3 |
| $C_4$'s, Vol. Percent | 10.5 | 9.6 | 9.7 | 5.1 | 9.4 |
| $C_5$'s, Vol. Percent | 6.3 | 8.2 | 8.8 | 4.3 | 7.8 |
| $C_6$—170° F., Vol. Percent | 9.2 | 10.2 | 6.7 | 6.5 | 6.8 |
| 170-390° F., Vol. Percent | 35.4 | 35.8 | 35.0 | 40.7 | 37.2 |
| 390-650° F., Vol. Percent | 30.1 | 25.2 | 24.2 | 30.9 | 22.7 |
| 650° F.+, Vol. Percent | 23.5 | 26.3 | 29.6 | 26.4 | 30.6 |
| $H_2$ Consumption, s.c.f./bbl | 1,210 | 1,290 | 1,115 | 1,115 | 1,180 |
| Yields, Calculated at 40% Conv., 100%—390° F.+: | | | | | |
| Dry Gas, Wt. Percent | 1.9 | 1.9 | 1.9 | 1.4 | 2.0 |
| $C_4$'s, Vol. Percent | 9.1 | 7.8 | 8.4 | 4.8 | 8.0 |
| 170-390° F., Vol. Percent | 32.4 | 32.0 | 32.0 | 38.5 | 33.8 |
| $C_5$+, Vol. Percent | 105.7 | 107.2 | 105.4 | 108.6 | 106.3 |
| Used Catalyst, Wt. Percent C | 8.6 | | 8.4 | 9.5 | 7.5 |
| Hydrogen Regeneration: | | | | | |
| Average Catalyst Temperature, ° F | 798 | 798 | 798 | 794 | |
| Time, Days | 2 | 2 | 2 | 2 | |
| Regenerated Catalyst, Wt. Percent C | 1.00 | 0.90 | 1.1 | 1.1 | |

In comparing the data of the oxidative regeneration hydrocracking process of Table IV and the hydrogenative regeneration hydrocracking process of Table V in the use of a platinum catalyst, it should be noted, again, that the dry gas make of the hydrogenative regeneration is not significantly higher after 4 regenerations; however, in the oxidative regeneration hydrocracking process, the dry gas make has significantly increased after only one regeneration. Furthermore, the $C_5+$ yield in the hydrogenative process appears to be constant and higher than those of the fresh catalyst after several regenerations with hydrogen while in using oxygen in regeneration, substantial decreases in $C_5+$ yields were noted after one regeneration.

EXAMPLE 8

A crystalline sodium aluminosilicate, identified as 13-X molecular sieve in U.S. 2,882,244, was converted to a rare earth aluminosilicate by the same procedure as that used in Example 1. The resulting rare earth aluminosilicate was pelleted and crushed to 14 to 25 mesh particles and then vacuum spray impregnated with an equeous solution of sodium chloroplatinate. The solution contained 0.0876 gram of platinum per milliliter and 0.256 gram of sodium per gram of platinum and was made by mixing aqueous chloroplatinic acid with aqueous sodium hydroxide. The amount of this solution which was used corresponded to 2.5 grams of platinum per 100 grams of rare earth aluminosilicate support.

The resulting material was wet aged in a partially covered container for 16 hours at 230° F. It was then reduced at atmospheric pressure with flowing hydrogen for 2 hours at 450° F. and 2 more hours at 950° F.

The final catalyst contained 0.79 percent Cl, and 1.0 percent Na, and had a surface area of 420 m.²/gm.

The Mid-Continent heavy gas oil described in Example 1 was hydrocracked in the presence of the catalyst described above. The hydrocracking conditions utilized were 2000 pounds per square inch pressure, a liquid hourly space velocity of 0.5, a hydrogen charge rate of 3000 standard cubic feet per barrel of hydrocarbon charge and reaction temperatures to obtain approximately 40 volume percent conversion to products boiling below 390° F. The catalyst was subjected to 3 days of hydrocracking and then regenerated with hydrogen for 2 days to remove substantially all of the accumulated coke. The hydrocracking data are described in Table VI below:

EXAMPLE 9

A catalyst of platinum on silica-zirconia was prepared by impregnating a silica-zirconia cogel containing 11.0 percent by weight $ZrO_2$ (on a dry solids basis), formed at 8.2–8.5 pH and activated in 2 percent by weight aqueous solution of $H_2SO_4$ for 24 hours at 200° F., with chloroplatinic acid to yield 0.5 per cent by weight platinum on the finished catalyst.

The silica-zirconia base in this example was prepared by continuously mixing through a nozzle 380 cc. per minute of solution A, a dilute solution of N-brand sodium silicate, and 416 cc. per minute of solution B, an acid zirconium sulfate solution. The composition of solution A was 60 weight percent N-brand sodium silicate and 40 weight percent water, and had a specific gravity of 1.206 at 80° F. The composition of solution B was 6.61 weight percent zirconium sulfate $[Zr(SO_4)_2 \cdot 4H_2O]$, 89.77 weight percent water, and 3.62 weight percent $H_2SO_4$, and had a specific gravity of 1.064 at 80° F. The resulting sol required 2 seconds to set to a gel at 63° F. and a pH of 8.2–8.5. The sol was formed into a bead hydrogel in the conventional manner. The hydrogel beads were then heat treated 24 hours at 200° F. in 2 percent sulfuric acid (½ volume acid per volume of catalyst), thus reducing the pH of the hydrogel to 2.0. The activated hydrogel was thereafter base-exchanged with 2 weight percent aqueous ammonium chloride solution, washed free of chloride ion, dried for 16 hours at 280° F. in air and calcined 10 hours at 1200° F. in air. The silica-zirconia gel base so obtained was characterized by a surface area of 627 m.²/g.; an apparent density of 0.84 g./cc.; and a weight composition of 0.04 percent Na, 0.10 percent $SO_4$, 11.0 percent $ZrO_2$, the remainder being $SiO_2$.

Platinum was deposited upon the silica-zirconia base by vacuum spray impregnating the base with an aqueous chloroplatinic acid solution. For 558 grams of the base, use 31.8 cc. of $H_2PtCl_6$ solution, containing 0.0879 g. Pt per cc., diluted to 301 cc. with water. The resulting impregnated catalyst was wet aged 16 hours at 230° F. in a covered container so that very little loss of water occurred. The aged particles were thereafter reduced with hydrogen for 2 hours at 450° F. and 2 hours at 950° F. The finished catalyst had a density of 0.749 g./cc., a surface area of 538 m.²/g. and contained 0.50 weight percent platinum and 0.19 weight percent chlorine.

*Table VI.—Alternate hydrocracking and hydrogen regeneration cycles using 2% platinum on rare-earth aluminosilicate catalyst*

| No. | 1 | 2 | 3 | 4 | 5 | 6 |
|---|---|---|---|---|---|---|
| Hydrocracking Step: | | | | | | |
| Activity, ° F. at 48 Hours | 725 | 725 | 725 | 715 | 715 | 715 |
| Material Balance at 2.5 Days: | | | | | | |
| Dry Gas, wt. Percent | 1.6 | 1.6 | 2.2 | 1.6 | 2.0 | 1.5 |
| Heavy Naphtha, vol. percent | 34.5 | 36.5 | 33.5 | 39.9 | 33.4 | 35.0 |
| $C_5+$ Yield, vol. percent | 107.8 | 107.1 | 105.1 | 107.7 | 105.8 | 108.0 |
| C on Used Catalyst, wt. percent | 13.6 | 12.0 | 12.0 | 7.9 | 21.4 | 11.0 |
| $H_2$ Regeneration Step: [a] | | | | | | |
| Temperature, ° F. | 800 | 800 | 800 | 800 | 800 | 800 |
| Catalyst After Regeneration: | | | | | | |
| Surface Area m²/gm. | | 395 | 395 | 320 | | 310 |
| D.A. | | 1,400 | 950 | 390 | | 210 |
| C, wt. percent on Catalyst | 0.4 | 0.5 | 0.5 | <0.05 | 0.2 | 0.7 |

[a] $H_2$ rate equivalent to 3,000 s.c.f./bbl. at 0.5 LHSV, each regeneration lasting 2 days.

The hydrocracking results of Example 8 are consistent with the other examples; namely, the use of platinum deposited on rare earth aluminosilicate and hydrogen regeneration provides a cyclic hydrocracking operation producing and maintaining improved $C_5+$ yields with low dry gas make over at least six hydrocracking and hydrogen regenerating operations.

EXAMPLE 10

The Mid-Continent heavy gas oil described in Example 1 was hydrocracked for six days in the presence of the catalyst of Example 9. The hydrocracking conditions utilized were 2000 pounds per square inch pressure, a liquid hourly space velocity of 0.5, a hydrogen charge rate of 3000 standard cubic feet per barrel of hydrocarbon charge, and reaction temperatures to obtain approximately 40 volume percent conversion to products boiling below 390° F. At this point the catalyst had accumulated an amount of coke equivalent to 3.9 weight percent C on catalyst. The hydrocracking performance of this catalyst in the third day on stream is presented in column 1 of Table VII.

Another batch of platinum on silica-zirconia prepared in a similar way was used to hydrocrack the Mid-Continent gas oil for six days under the same conditions. This catalyst contained 0.53 weight percent platinum, 0.20 weight percent chlorine, had a surface area of 536 m.²/g., and had a density of 0.748 g./cc. After 6 days of hydrocracking, the accumulation of coke on the catalyst was equivalent to 4.8 weight percent C on the catalyst. After this 6 days of hydrocracking, the catalyst was regenerated with hydrogen for 2 days at 800° F. just as had been done with the nickel-tungsten-sulfide on rare earth aluminosilicate catalyst of Example 3, Table II. The regenerated catalyst was then used again for hydrocracking the Mid-Continent gas oil under the same conditions as those employed initially. The hydrocracking performance of this regenerated catalyst in the third day on stream are presented in column 2 of Table VII.

*Table VII.—Hydrogen regeneration of a less active catalyst*

| Column | 1 Fresh | 2 After Regeneration |
|---|---|---|
| C on Catalyst, Wt. percent | 0 | 2.2 |
| Hydrocracking: | | |
| Total Time on Stream, Days | 6 | 3 |
| Material Balance Data: | | |
| Time Taken, Hours | 64-68 | 65-75 |
| Average Catalyst Temp., ° F | 798 | 808 |
| Conversion, Vol. percent 100%—390° F.+ | 37.7 | 38.5 |
| Conversion, Vol. percent 100%—650° F.+ | 81.3 | 76.4 |
| Recovery, Wt. percent | 99.9 | 95.7 |
| Yields, NLB: | | |
| Dry Gas, Wt. percent | 1.9 | 2.4 |
| C₄'s Vol. percent | 4.8 | 5.4 |
| C₅'s Vol. percent | 5.0 | 4.3 |
| C₆—170° F., Vol. percent | 4.5 | 7.8 |
| 170-390° F, Vol. percent | 36.8 | 34.3 |
| 390-650° F., Vol. percent | 43.6 | 37.9 |
| 650° F.+, Vol. percent | 18.7 | 23.6 |
| Hydrogen Consumption, s.c.f./bbl | 1,020 | 1,100 |
| Yields, Calculated at 40% Conv., 100%—390° F.+: | | |
| Dry Gas, Wt. percent | 2.0 | 2.5 |
| C₄'s, Vol. percent | 5.1 | 5.6 |
| 170-390° F., Vol. percent | 38.4 | 35.2 |
| C₅'s, Vol. percent | 108.5 | 107.8 |

The data of Table VII indicate that if hydrocracking temperature conditions in excess of 790° F. are used, hydrogen regeneration is found to be ineffective to recover the activity desired of the catalyst. Higher temperatures required of the regenerated catalyst are required to obtain similar conversions of the fresh catalyst. Lower $C_5+$ yields are also present in the use of the hydrogen regenerated catalyst over the fresh catalyst. This data clearly demonstrate that the use of hydrocracking temperatures in excess of 790° F. are to be avoided to obtain the improvements of the process of this invention.

What is claimed is:

1. A process for low temperature hydrocracking of a hydrocarbon charge having an initial boiling point of at least about 400° F., a 50 percent point of at least about 500° F. and an end boiling point of at least about 600° F. and containing components capable of producing coke under conditions at which said hydrocracking is effected, in a cyclic operation which comprises contacting said hydrocarbon charge in the presence of hydrogen under hydrocracking conditions at a temperature above about 400° F. but not exceeding 790° F. with a hydrocracking catalyst comprising a crystalline aluminosilicate and having an activity sufficient to provide at least about 20 volume percent conversion of said hydrocarbon charge to products boiling below about 390° F. for a period of time until coke accumulates on said catalyst to an extent necessitating the use of a higher temperature than the initial hydrocracking temperature, but not exceeding 790° F., to obtain said conversion; discontinuing the contacting of said hydrocarbon charge; and contacting said hydrocracking catalyst, without oxidative regeneration thereof, with hydrogen at a temperature in the range from about 400° F. to below the temperature of thermal injury to said hydrocracking catalyst and for a period of time sufficient to remove substantially all of the accumulated coke from said catalyst.

2. The process of claim 1 wherein the hydrocracking temperatures range from about 600° F. to about 750° F.

3. The process of claim 1 wherein the hydrocracking temperatures range from about 600° F. to about 750° F. and hydrocracking pressures range from about 200 to about 3000 pounds per square inch.

4. The process of claim 1 wherein the hydrogen regeneration temperatures range from about 40° F. to about 450° F. higher than the hydrocracking temperatures used.

5. A process for low temperature hydrocracking a hydrocarbon charge having an initial boiling point of at least about 400° F., a 50 percent point of at least about 500° F. and an end boiling point of at least about 600° F. and containing components capable of producing coke under conditions at which said hydrocracking is effected, in a cyclic operation which comprises contacting said hydrocarbon charge in the presence of hydrogen under hydrocracking conditions at a temperature above about 400° F. but not exceeding 790° F. with a catalyst consisting essentially of a hydrogenation component on a crystalline alumino-silicate having an alkali metal content of less than about 3 weight percent and having an activity sufficient to provide at least about 20 volume percent conversion of said hydrocarbon charge to products boiling below about 390° F. for a period of time until coke accumulates on said catalyst to an extent necessitating the use of a higher temperature than the initial hydrocracking temperature, but not exceeding 790° F. to obtain said conversion; discontinuing the contacting of said hydrocarbon charge; and contacting said hydrocracking catalyst, without oxidative regeneration thereof, with hydrogen at a temperature in the range from about 400° F. to below the temperature of thermal injury to said hydrocracking catalyst and for a period of time sufficient to remove substantially all of the accumulated coke from said catalyst.

6. The process of claim 5 wherein the hydrocracking temperatures range from about 600° F. to about 750° F.

7. The process of claim 5 wherein the hydrocracking temperatures range from about 600° F. to about 750° F. and hydrocracking pressures range from about 200 to about 3000 pounds per square inch.

8. The process of claim 5 wherein the hydrogen regeneration temperatures range from about 40° F. to about 450° F. higher than the hydrocracking temperatures used.

9. A process for low temperature hydrocracking of a hydrocarbon charge having an initial boiling point of at least about 400° F., a 50 percent point of at least about 500° F. and an end boiling point of at least about 600° F. and containing components capable of producing coke under conditions at which said hydrocracking is effected, in a cyclic operation which comprises contacting said hydrocarbon charge in the presence of hydrogen under hydrocracking conditions at a temperature above about 400° F. but not exceeding 790° F. with a catalyst consisting essentially of a hydrogenation component selected from the group consisting of metals, oxides and sulfides of metals of Groups VIA and VIII of the Periodic Table deposited on rare earth crystalline aluminosilicates having an alkali metal content of less than about 3 weight percent and having an activity sufficient to provide at least about 20 volume percent conversion of said hydrocarbon charge to products boiling below about 390° F., for a period of time until coke accumulates on said catalyst to an extent necessitating the use of a higher temperature than the initial hydrocracking temperature but not exceeding 790° F. to obtain said conversion; discontinuing the contacting of said hydrocarbon charge; and contacting said hydrocracking catalyst, without oxidative regeneration thereof, by contacting with hydrogen at a temperature in the range from about 400° F. to below the temperature of thermal injury to said hydrocracking catalyst and for a period of time sufficient to remove substantially all of the accumulated coke from said catalyst.

10. The process of claim 9 wherein the catalyst used is sulfided nickel-tungsten deposited on rare earth crystalline aluminosilicate.

11. The process of claim 9 wherein the catalyst used is sulfided cobalt oxide-molybdenum oxide deposited on rare earth crystalline aluminosilicate.

12. The process of claim 9 wherein the catalyst used is platinum on rare earth crystalline aluminosilicate.

13. The process of claim 9 wherein the hydrocracking temperatures range from about 600° F. to about 750° F.

14. The process of claim 9 wherein the hydrocracking temperatures range from about 600° F. to about 750° F. and hydrocracking pressures range from about 200 to about 3000 pounds per square inch.

15. The process of claim 9 wherein the hydrogen regeneration temperatures range from about 40° F. to about 450° F. higher than the hydrocracking temperatures used.

16. A process for low temperature hydrocracking of a hydrocarbon charge having an initial boiling point of at least about 400° F., a 50 percent point of at least about 500° F. and an end boiling point of at least about 600° F. and containing components capable of producing coke under conditions at which said hydrocracking is effected, in a cyclic operation which comprises contacting said hydrocarbon charge in the presence of hydrogen under hydrocracking conditions at a temperature above about 400° F. but not exceeding 790° F. with a catalyst consisting essentially of a hydrogenation component deposited on a composite composed essentially of a crystalline alumino-silicate having an alkali metal content of less than about three weight percent and suspended and distributed throughout a hydrous oxide matrix selected from the group consisting of clay and inorganic oxide gels and having an activity sufficient to provide at least about 20 volume percent conversion of said hydrocarbon charge to products boiling below about 390° F., for a period of time until coke accumulates on said catalyst to an extent necessitating the use of a higher temperature than the initial hydrocracking temperature but not exceeding 790° F. to obtain said conversion; discontinuing the contacting of said hydrocarbon charge; and contacting said hydrocracking catalyst, without oxidative regeneration thereof, with hydrogen at a temperature in the range from about 400° F. to below the temperature of thermal injury to said hydrocracking catalyst for a period of time sufficient to remove substantially all of the accumulated coke from said catalyst.

17. The process of claim 16 wherein the hydrocracking temperatures range from about 600° F. to about 750° F.

18. The process of claim 16 wherein the hydrocracking temperatures range from about 600° F. to about 750° F. and hydrocracking pressures range from about 200 to about 3000 pounds per square inch.

19. The process of claim 16 wherein the hydrogen regeneration temperatures range from about 40° F. to about 450° F. higher than the hydrocracking temperature used.

20. A process for low temperature hydrocracking a hydrocarbon charge having an initial boiling point of at least about 400° F., a 50 percent point of at least about 500° F. and an end boiling point of at least about 600° F. and containing components capable of producing coke under conditions at which said hydrocracking is effected, in a cyclic operation which comprises contacting said hydrocarbon charge in the presence of hydrogen under hydrocracking conditions at a temperature in the range from about 600° F. to about 750° F. with a catalyst consisting essentially of a hydrogenation component selected from the group consisting of metals, oxides and sulfides of Groups VIA and VIII of the Periodic Table deposited on rare earth crystalline aluminosilicates having an alkali metal content of less than about three weight percent and said aluminosilicates suspended and distributed throughout a hydrous oxide matrix selected from the group consisting of clay and an inorganic oxide gel and having an activity sufficient to provide at least about 20 volume percent conversion of said hydrocarbon charge to products boiling below about 390° F., for a period of time until coke accumulates on said catalyst to an extent necessitating the use of a higher temperature than the initial hydrocracking temperature but not exceeding 790° F. to obtain said conversion; discontinuing the contacting of said hydrocarbon charge; and contacting said hydrocracking catalyst, without oxidative regeneration thereof, with hydrogen at temperatures in the range from about 400° F. to below the temperature of thermal injury to said hydrocracking catalyst for a period of time sufficient to remove substantially all of the accumulated coke from said catalyst.

21. A process for low temperature hydrocracking a hydrocarbon charge having a boiling point in excess of 600° F. and containing components capable of producing coke under conditions at which said hydrocracking is effected, in a cyclic operation, which comprises contacting said hydrocarbon charge in the presence of hydrogen under hydrocracking conditions at a temperature above about 400° F. but not exceeding 790° F. with a catalyst consisting essentially of a hydrogenation component selected from the group consisting of metals, oxides and sulfides of Groups VIA and VIII of the Periodic Table deposited on a composite composed essentially of rare earth crystalline aluminosilicates having an alkali metal content of less than about three weight percent and said aluminosilicates suspended and distributed throughout a hydrous oxide matrix selected from the group consisting of clay and inorganic oxide gels and having an activity sufficient to provide from about 20 to about 55 volume percent conversion of said hydrocarbon fraction to products boiling below about 390° F., for a period of time until coke accumulates on said catalyst to an extent requiring the use of a higher temperature than the initial hydrocracking temperature but not exceeding 790° F. to obtain said conversion; discontinuing the contacting of said hydrocarbon charge; and contacting said hydrocracking catalyst, without oxidative regeneration thereof, with hydrogen at temperatures in the range from about 400° F. to temperatures below the temperature of thermal injury to said hydrocracking catalyst for a period of time sufficient to remove substantially all of the accumulated coke from said catalyst.

22. The process of claim 21 wherein the hydrocracking temperatures range from about 600° F. to about 750° F.

23. The process of claim 21 wherein the hydrocracking temperatures range from about 600° F. to about 750° F. and hydrocracking pressures range from about 200 to about 3000 pounds per square inch.

24. The process of claim 21 wherein the hydrogen regeneration temperatures range from about 40° F. to about 450° F. higher than the hydrocracking temperatures used.

25. In a process for hydrocracking a hydrocarbon charge by contacting the same in the presence of hydrogen with an active hydrocracking catalyst comprising a crystalline aluminosilicate under hydrocracking conditions and subsequently removing carbonaceous deposit, attributable to said hydrocracking, from the surface of said catalyst; the improved method of operation which comprises carrying out said hydrocracking at a temperature not exceeding 790° F. and subsequently removing said carbonaceous deposit from said catalyst, without oxidative regeneration thereof, by subjecting the spent catalyst at an elevated temperature of at least about 400° F. to an atmosphere consisting essentially of hydrogen.

26. The process of claim 25 wherein the temperature of hydrocracking does not exceed 750° F.

27. The process of claim 25 wherein the temperature at which carbonaceous deposit is removed from the catalyst is 40° F. to 450° F. in excess of the temperature of hydrocracking.

28. The process of claim 25 wherein said catalyst comprises a hydrogenation component deposited on a crystalline aluminosilicate.

References Cited by the Examiner

UNITED STATES PATENTS

| | | | |
|---|---|---|---|
| 1,894,785 | 1/33 | Peck | 252—411 |
| 2,472,844 | 6/49 | Munday et al. | 208—136 |
| 2,816,857 | 12/57 | Hemminger | 252—411 |
| 2,962,435 | 11/60 | Fleck et al. | 208—120 |
| 2,983,670 | 5/61 | Seubold | 208—110 |
| 3,039,953 | 6/62 | Eng | 208—26 |
| 3,048,536 | 8/62 | Coonradt et al. | 208—112 |
| 3,121,754 | 2/64 | Mattox et al. | 208—120 |

ALPHONSO D. SULLIVAN, *Primary Examiner.*

UNITED STATES PATENT OFFICE
CERTIFICATE OF CORRECTION

Patent No. 3,210,265                                              October 5, 1965

William E. Garwood

It is hereby certified that error appears in the above numbered patent requiring correction and that the said Letters Patent should read as corrected below.

Column 2, line 36, for "theretofore" read -- heretofore --; column 6, line 18, after "weight" insert -- mean --; columns 11 and 12, Table I, fifth column, line 22 thereof, for "7.4" read -- 7.3 --.

Signed and sealed this 20th day of September 1966.

(SEAL)
Attest:

ERNEST W. SWIDER                                            EDWARD J. BRENNER
Attesting Officer                                                    Commissioner of Patents